A. KRASTIN
THEFT ALARM FOR AUTOMOBILES.
APPLICATION FILED DEC. 8, 1919.

1,368,734.

Patented Feb. 15, 1921.
3 SHEETS—SHEET 1.

INVENTOR
A. Krastin
By John A. Bornhardt
Atty.

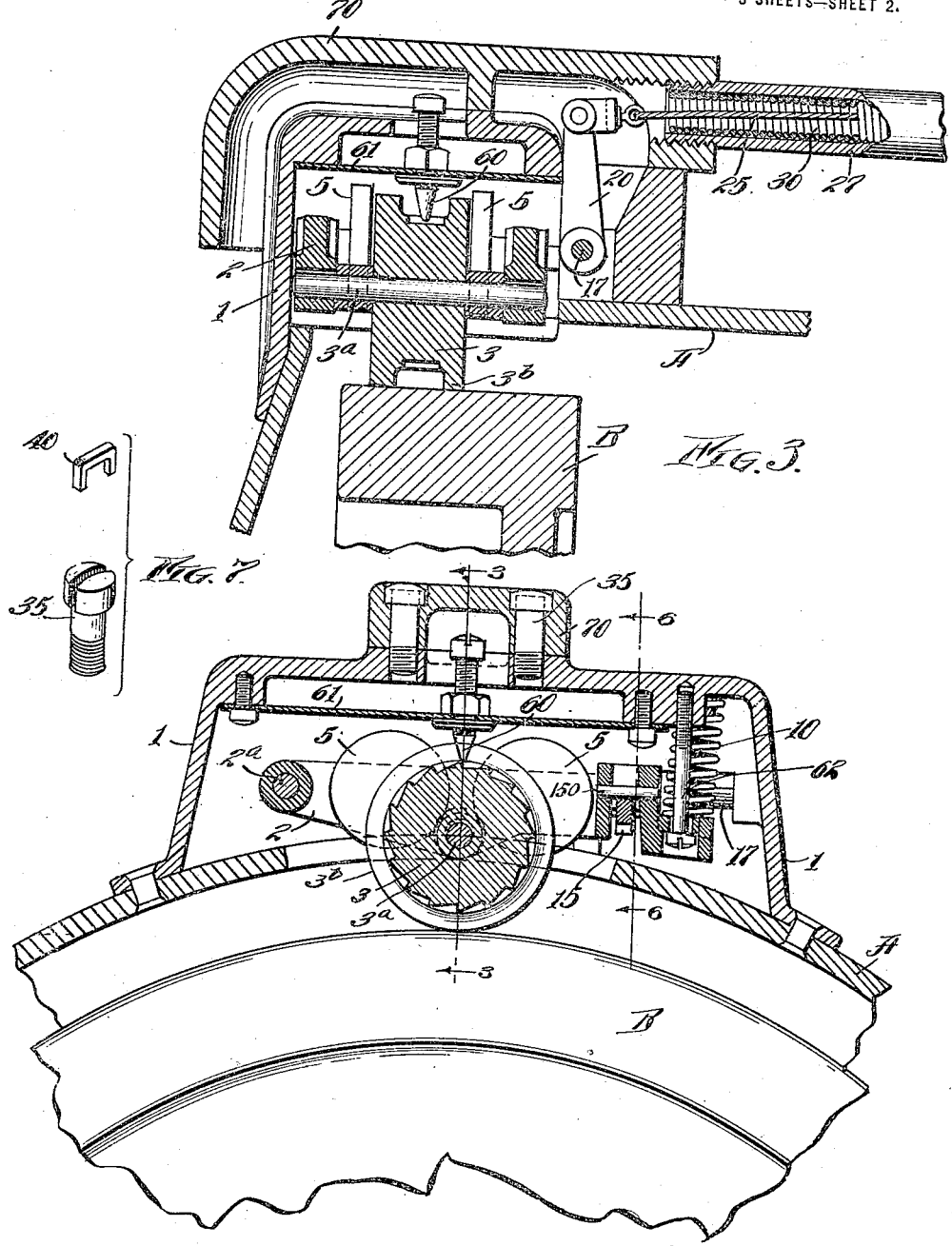

A. KRASTIN.
THEFT ALARM FOR AUTOMOBILES.
APPLICATION FILED DEC. 8, 1919.
1,368,734.
Patented Feb. 15, 1921.
3 SHEETS—SHEET 3.
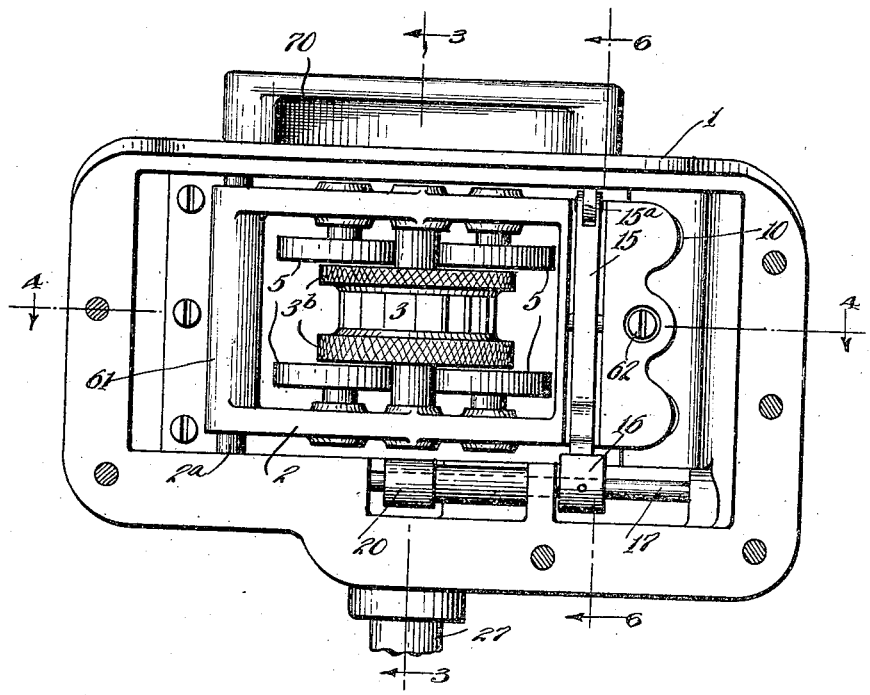
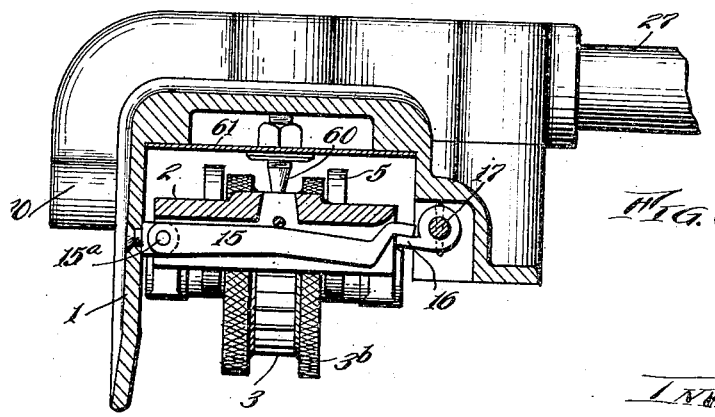

UNITED STATES PATENT OFFICE.

AUGUST KRASTIN, OF CLEVELAND, OHIO, ASSIGNOR OF TWO AND ONE-HALF ONE-HUNDREDTHS TO GEORGE SCHENKER AND NINETY-FIVE ONE-HUNDREDTHS TO WILLIAM J. McSORLEY ADMINISTRATOR OF THE ESTATE OF RALPH V. BRANDT, WILLIAM J. McSORLEY, AND E. K. YOUNG, ALL OF CLEVELAND, OHIO, AND D. E. HERSHEY, OF LORAIN, OHIO.

THEFT-ALARM FOR AUTOMOBILES.

1,368,734.

Specification of Letters Patent. Patented Feb. 15, 1921.

Application filed December 8, 1919. Serial No. 343,163.

*To all whom it may concern:*

Be it known that I, AUGUST KRASTIN, a citizen of the United States, residing at Cleveland, in the county of Cuyahoga and State of Ohio, have invented certain new and useful Improvements in Theft-Alarms for Automobiles, of which the following is a specification.

This invention relates to theft alarms for automobiles and has for its object to provide an improved device by means of which the operation of the engine, when the alarm is set, will produce a loud noise which will serve to indicate that the machine is being operated by an unauthorized person.

The device consists of an alarm fixed to the crank case of the engine and provided with a wheel which may be pressed to contact with the rim of the fly-wheel, and the first mentioned wheel is provided with notches which bear against a point or stylus carried by a diaphragm so that rotation of the wheel vibrates the diaphragm and produces a loud noise.

Figure 1:
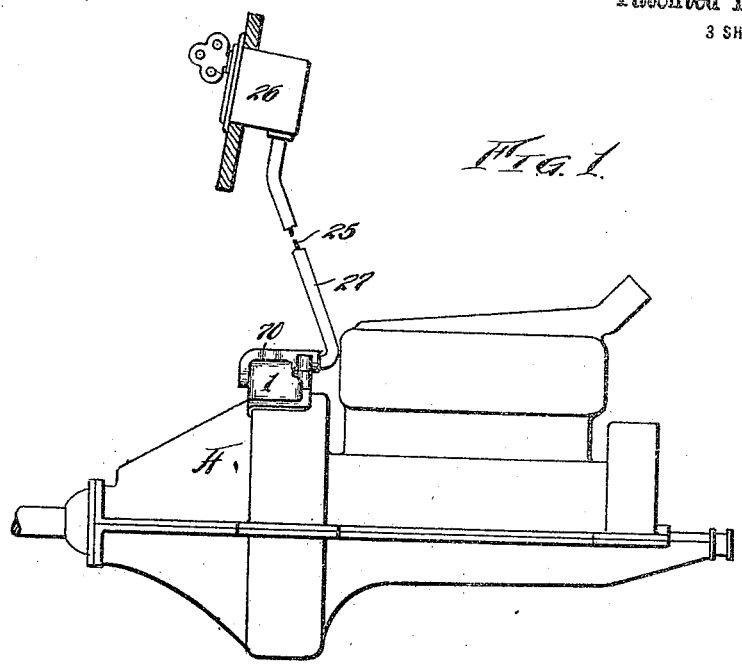
Figure 2:
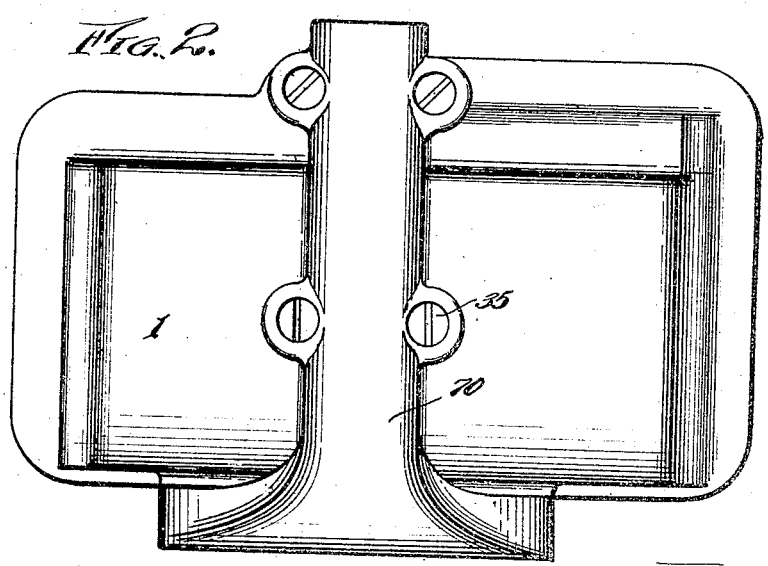

The details of the invention will be more fully apparent from the following description and the accompanying drawings, in which Figure 1 is a side elevation of an automobile engine provided with the device. Fig. 2 is a plan view of the alarm attachment. Fig. 3 is a section on the line 3—3 of Fig. 4. Fig. 4 is a section on the line 4—4 of Fig. 5. Fig. 5 is a plan of the attachment inverted. Fig. 6 is a section on the line 6—6 of Figs. 4 and 5. Fig. 7 is a detail of a screw lock.

Referring specifically to the drawings, A indicates the crank casing of an automobile engine on which is mounted the alarm housing 1, adjacent to the fly-wheel B of the engine. This housing incloses a frame 2 which is pivoted on a cross rod 2ª within the housing. The frame carries a notched wheel 3 the shaft 3ª of which is supported on rollers 5 carried by the frame, to provide an anti-friction bearing for the wheel. The wheel 3 has knurled rims 3ᵇ which are adapted to bear upon the periphery of the fly-wheel, the rims being knurled to provide a driving engagement. The frame 2 may be swung on its pivot to engage or disengage said rims from the fly-wheel. An adjustable pin or point 60 bears on the notched part of the wheel 3, and this pin is fastened to the center of a diaphragm 61 secured to the top of the housing 1.

The frame 2 is normally pressed down to engage the wheel 3 with the fly-wheel by means of springs 10 in compression between the housing 1 and the free end of the frame, the movement being limited by the stop screw 62. The frame is swung up by a lever 15 pivoted at 15ª to a bracket on the housing and bearing under a pin 150 set in a recess in the frame. Said pin gives a single point bearing, without friction, and adapted to be engaged by a finger 16 carried by a rock shaft 17 which has an arm 20 connected by a cable 25 to a locked operating device in the casing 26 conveniently located on the instrument board of the machine. The cable 25 extends through a pipe 27 containing a highly tempered coil spring 30 which prevents access to the cable and will resist any ordinary cutting instrument. The housing is provided with a cover 70 held on by screws 35 which are locked by means of staples 40 driven through the slot in the ends of the screws after they are inserted in place. These staples prevent the screws being taken out.

In operation of the device, when the alarm is set the cable 25 will be released permitting the springs 10 to swing the frame until the rims 3ᵇ of the wheel 3 rest on the fly-wheel B. If the engine is then started the rotation of the fly-wheel will drive the wheel 3, and its notched surfaces acting against the pin 60 will vibrate the diaphragm and produce a loud and discordant noise serving as notice that the machine is being stolen. The alarm may be thrown out of action by pulling the cable 25 which lifts the wheel 3 from contact with the fly-wheel by swinging the frame 2 upwardly and the fly-wheel may then turn without operation of the signal.

Various modifications may be made in the details of the device, within the scope of the invention.

I claim:

1. The combination with an engine fly wheel and its casing, said casing having an opening therein, of a closed housing mounted on the casing and covering said opening, a lock, a closed conduit connecting the lock and the housing, an alarm device in the housing, including a rotary part movable in said opening, into and out of contact with the fly wheel, and means to so move said rotary part, including a cable inclosed in the conduit.

2. The combination with an engine flywheel and its housing, of an alarm mounted on the housing and including a notched wheel movable into and out of contact with the fly-wheel, a sound producing device operated by said notched wheel, and means extending outside the housing to move the wheel into and out of contact with said fly-wheel.

3. The combination with a rotary part of an engine, of an inclosed alarm device movable into and out of operative contact with said rotary part, a cable connected to said device to move the same, a lock and a conduit inclosing said cable between said lock and device and provided with a protective armor.

In testimony whereof, I do affix my signature in presence of two witnesses.

AUGUST KRASTIN.

Witnesses:
JOHN A. BOMMHARDT,
EUGENE A. CANNING.